United States Patent [19]

Meunier et al.

[11] Patent Number: 5,156,748
[45] Date of Patent: Oct. 20, 1992

[54] CATALYTIC PROCESS FOR OXIDATIVE DEGRADATION OF AQUEOUS EFFLUENTS CONTAINING TOXIC HYDROCARBON COMPOUNDS

[75] Inventors: Bernard Meunier, Castanet Tolosan; Gilles Labat, Tolouse; Jean Louis Seris, Jurancon, all of France

[73] Assignees: S.N.E.A., Courbevoi; Atochem, Puteaux, both of France

[21] Appl. No.: 752,509

[22] PCT Filed: Dec. 18, 1990

[86] PCT No.: PCT/FR90/00919
 § 371 Date: Sep. 20, 1991
 § 102(e) Date: Sep. 20, 1991

[87] PCT Pub. No.: WO91/08985
 PCT Pub. Date: Jun. 27, 1991

[30] Foreign Application Priority Data
Dec. 18, 1989 [FR] France ............... 89 16690

[51] Int. Cl.⁵ ............... G02F 1/68; G02F 1/72
[52] U.S. Cl. ............... 210/759; 210/763; 210/909

[58] Field of Search ............... 210/759, 763, 909

[56] References Cited

U.S. PATENT DOCUMENTS

| 2,951,797 | 9/1960 | Sharp | 210/763 |
| 2,966,453 | 12/1960 | Gleim et al. | 208/206 |
| 3,252,892 | 5/1966 | Gleim | 208/206 |
| 4,804,480 | 2/1989 | Jayawant | 210/763 |
| 5,004,551 | 4/1991 | Sublette | 210/763 |

FOREIGN PATENT DOCUMENTS

89/08079 9/1989 World Int. Prop. O.
89/08614 9/1989 World Int. Prop. O.

*Primary Examiner*—Wayne Langel
*Attorney, Agent, or Firm*—Burgess, Ryan & Wayne

[57] ABSTRACT

A method is provided which involves a catalytic treatment using oxidation to degrade aqueous effluent which contains toxic, cyclic hydrocarbons and in particular chlorous, compounds. The method utilizes a catalytic system consisting of an oxygen donor agent, water-soluble peroxide, and a water-soluble metallo (Fe,Mn)phenyl-substituted mesotetraphenylporphyrin.

11 Claims, No Drawings

CATALYTIC PROCESS FOR OXIDATIVE DEGRADATION OF AQUEOUS EFFLUENTS CONTAINING TOXIC HYDROCARBON COMPOUNDS

BACKGROUND OF THE INVENTION

1) Field of the Invention

The invention relates to a catalytic process for oxidative degradation of aqueous effluents containing cyclic hydrocarbon compounds known to be toxic.

Aromatic residues, chlorinated ones in particular, are notoriously difficult to oxidise and resistant to biodegradation.

Methods of treating effluents containing such residues rely either on catalysts based on manganese oxide or copper oxide CuO involving drastic operating conditions (temperature, pressure) or on sophisticated processes, for example photocatalysis.

The objective of the invention is to propose a process for treating such effluents which is easy to implement and which makes it possible to achieve rapidly high efficiencies of conversion of cyclic hydrocarbon compounds.

SUMMARY OF THE INVENTION

The subject of the present invention is a process for treatment by oxidative degradation of effluents containing saturated, unsaturated or aromatic mono- or polycyclic hydrocarbon compounds known to be toxic, characterised in that it is carried out in the presence of a catalyst consisting of a water-soluble metalated meso-tetraphenylporphyrin in combination with a water-soluble peroxide as oxygen-donor.

DESCRIPTION OF THE PREFERRED EMBODIMENTS

The effluents being treated may contain all kinds of cyclic hydrocarbon compounds known to be toxic such as, for example, polycondensed aromatics, chlorinated aromatics, chlorinated polycyclic aromatics, chlorinated cyclic aliphatic hydrocarbons and hydroxylated or alkoxylated aromatic hydrocarbons.

These compounds may be, for example:
benzo(a)pyrene, pyrene, anthracene, phenanthrene, benzanthracene,
4-hydroxy-3-methoxybenzaldehyde
7-hydroxy-4-methylcoumarin
pyrogallol
3,4-dimethylcatechol
vanillin
2,4,6-trichlorophenol
4,5-dichloroguaiacol
4,5,6-trichloroguaiacol
3,4-dichloroaniline
2,4-dichlorophenol
2,4,5-trichlorophenol
pentachlorophenol
DDT: 1,1-bis(4-chlorophenyl)-2,2,2-trichloroethane
Arochlor 1254
2,3,7,8-tetrachlorodibenzo-p-dioxin
3,4,3',4',-tetrachlorobiphenyl
2,4,5,2',4',5',-hexachlorobiphenyl
lindane: 1,2,3,4,5,6-hexachlorocyclohexane.

The porphyrin which can be employed in the process of the invention will be preferably metalated with iron or manganese.

This porphyrin is meso-tetraphenyl-substituted and its water-soluble nature will be preferably conferred by at least one substituent exhibiting this nature, for example a sulphonate functional group placed in position 3, 4 or 5 of these phenyl nuclei.

The phenyl nuclei of these meso-substituted porphyrins will preferably carry in positions 2 and 6 substituents such as halogens or alkyl hydrocarbon radicals containing from 1 to 6 carbon atoms or aryl radicals, which will avoid the formation of $\mu$-oxo units in the oxidising reaction medium, since these can entail a deactivation of the catalyst or even its destruction.

Processes for the synthesis of such porphyrins have been described by R. W. Wagner, J. S. Lindsey et al. Tetrahedron Lett., 28, 3069–3070; 1987 and by the Applicant Company in a pending French patent application filed on Oct.8, 1989 under No. 89/10,762.

The process of the invention can be carried out either with homogeneous catalysis, especially when the catalyst consists of an iron porphyrin, or with heterogeneous catalysis. Assuming the latter, the porphyrin is then attached to an insoluble support of resin type. The latter may, for example, be a polymer carrying pyridine or imidazole functional groups, which will be particularly well-suited to a process employing a manganese porphyrin.

The oxidation mechanism of the process involves the presence of a water-soluble peroxide as oxygen-donor. This peroxide will be inorganic or organic.

By way of example of peroxides suited to the process of the invention there may be mentioned: inorganic peroxides, such as $H_2O_2$ or $KHSO_5$, organic peroxides: MMPP (magnesium salt of monoperphthalic acid) for example, and alkyl hydroperoxides: for example t-BuOOH.

The process of the invention is carried out in an aqueous medium at an acidic pH which is generally lower than or equal to 6 and preferably lower than 4.

Furthermore, it will be advantageous to employ a reaction medium consisting of a mixture of water and acetonitrile which has an acetonitrile content of between 5 and 70% by volume and preferably between 20 and 50%.

The process of the invention will be understood better on reading the examples below by way of illustration without any limitation being implied.

The porphyrins employed in the examples below:
a) FeTPPS, sulphonated Fe-meso-tetraphenylporphyrin
b) FeTMPS, sulphonated Fe-meso-tetramesitylporphyrin
c) FeTDCPS, sulphonated Fe-meso-tetrakis-2,6-dichlorophenylporphyrin
d) FeTPPS-Ad, porphyrin a) attached to an Amberlite (R) resin support
e) FeTPPS-Ad, porphyrin a) attached to a polyvinylpyridinium support (support 2)
f) FeTMPS-Ad, porphyrin b) attached to an Amberlite (R) support
g) MnTPPS, sulphonated Mn-meso-tetraphenylporphyrin
h) MnTMPS-Ad(N), sulphonated Mn-meso-tetramesitylporphyrin attached to support 2 were synthesised by the processes described in European patent application 89/401,920.7 filed by the Applicant Company on May 7, 1989.

EXAMPLES 1 to 10

The model compound in these examples is 2,4,6-trichlorophenol, called substrate hereinafter, an aromatic compound present in large quantities in effluents when papermaking pulp is treated by processes using chlorine.

The general conditions of the catalytic tests performed on 2,4,6-trichlorophenol involving the formation of a quinone: 2,6-dichloro-1,4-benzoquinone, which is followed by analytical HPLC, C18, eluent 50/50 methanol/water, with detection at 280 nm, are the following:

EXAMPLE 1

Substrate (20 μmol, 500 μl of a 40 mM solution of acetonitrile in 2,4,6-trichlorophenol); FeTPPS (60 nmol, 50 μl of a 1.2 mM solution of iron porphyrin buffered at pH=3.0); 0.1M citrate-phosphate buffer (pH=3.0); $KHSO_5$(100 mol, 30.7 mg in 500 μl of pH 3.0 buffer).

EXAMPLE 2

Same experimental conditions as in Example 1. Replacement of $KHSO_5$ with $H_2O_2$ (12 μl of 8.6M $H_2O_2$ in 500 μl of 0.1M pH 3.0 citrate-phosphate buffer).

EXAMPLE 3

Same experimental conditions as in Example 1. FeTPPS containing 0.1% catalyst/substrate (17 μl of a 1.2 mM iron porphyrin solution buffered at pH=3.0).

EXAMPLE 4

Same experimental conditions as in Example 1. Replacement of FeTPPS with FeTMPS.

EXAMPLE 5

Same experimental conditions as in Example 4. Changes in the pH (pH=6.0, 0.5M phosphate buffer).

EXAMPLE 6

Same experimental conditions as in Example 4. Replacement of FeTMPS with FeTDCPS.

EXAMPLE 7

Same experimental conditions as in Example 2. Replacement of FeTPPS with FeTPPS-Ad (100 mg of support 1; 2 μmol of fixed iron porphyrin).

EXAMPLE 8

Same experimental conditions as in Example 7. Replacement of FeTPPS-Ad with FeTPPS-Ad (N) (100 mg of support 2; 2 μmol of fixed iron porphyrin).

EXAMPLE 9

Same experimental conditions as in Example 7. Replacement of FeTPPS-Ad with FeTMPS-Ad (100 mg of support 1; 2 μmol of fixed iron porphyrin).

EXAMPLE 10

Same experimental conditions as in Example 5. Replacement of FeTMPS with MnTPPS (2 μmol; 3 mg of manganese porphyrin dissolved in 500 μl of pH=6.0 buffer). Addition of 100 equivalents of 4-tert-butyl-pyridine/catalyst (200 μmol; 28 μl).

The results obtained are summarised in Table 1.

TABLE 1

| Ex. | Catalyst | % cat./ sub. | pH | Oxygen-donor | Conversion (%) 1 min | Conversion (%) 15 min |
|---|---|---|---|---|---|---|
| 1 | FeTPPS | 0.3 | 3.0 | $KHSO_5$ | 95 | 100 |
| 2 | FeTPPS | 0.3 | 3.0 | $H_2O_2$ | 2 | 75 |
| 3 | FeTPPS | 0.1 | 3.0 | $KHSO_5$ | 90 | 100 |
| 4 | FeTMPS | 0.3 | 3.0 | $KHSO_5$ | 95 | 100 |
| 5 | FeTMPS | 0.3 | 6.0 | $KHSO_5$ | 40 | 60 |
| 6 | FeTDCPS | 0.3 | 3.0 | $KHSO_5$ | 92 | 100 |
| 7 | FeTPPS-Ad | 10 | 3.0 | $KHSO_5$ | 15 | 45 |
| 8 | FeTPPS-Ad(N) | 10 | 3.0 | $KHSO_5$ | 25 | 55 |
| 9 | FeTMPS-Ad | 10 | 3.0 | $KHSO_5$ | 20 | 50 |
| 10 | MnTPPS | 10 | 6.0 | $KHSO_5$ | 30 | 60 |

The best degrees of conversion are obtained with homogeneous catalysis at acidic pH (pH 3) using potassium persulphate as oxygen-donor (Example 3 illustrates a 100% degree of conversion despite a low catalyst content).

Free or supported manganese porphyrins acting at pH=6.0 do not make it possible to synthesise 2,6-dichloro-1,4-benzoquinone, the polymerisation of the products formed being the preferred route at this pH.

EXAMPLES 11 to 15

The following catalytic tests clearly illustrate the easy application of the catalyst system presented: FeTPPS with various oxidising agents: $KHSO_5$, $H_2O_2$, MMPP and t-BuOOH (FeTPPS containing 0.1 or 0.3% catalyst/substrate). substrate).

The following catalytic tests are carried out in a homogeneous mixture made up of acetonitrile and water buffered at pH=3.0 (40/60 v/v) conducted at room temperature with a reaction time of 5 minutes. The mixture is enriched in acetonitrile when compared with tests carried out previously in order to solubilise the substrate in a larger quantity. Isolation of the quinonic products formed is carried out by successive dichloromethane extraction of the aqueous phase; a purification on silica gel 60 (70–230 mesh (Merck); eluent: 80/20 v/v dichloromethane/hexane), and a precipitation with hexane are performed on the quinonic product formed. The quinones are analysed and identified by both $^1H$ and $^{13}C$ NMR at 200 MHz.

The experimental conditions of the tests (all the tests are performed on 6 millimoles of substrate) are detailed below.

EXAMPLE 11

Substrate: 2,4,6-trichlorophenol (6 mmol; 1.185 g); acetonitrile (40 ml); 0.1M pH=3.0 citrate-phosphate buffer (50 ml); FeTPPS (18 μmol; 21 mg); oxidising solution (0.72M $KHSO_5$; 2.2 g of $KHSO_5$, 7.2 mmol) dissolved in 10 ml of 0.1M citrate-phosphate buffer. Complete conversion of the substrate is noted in less than 30 minutes. The main product obtained is 2,6-dichloro-1,4-benzoquinone (585 mg; Yld=55%).

Acetylation of the quinone: 100 mg of quinone (0.564 mmol) are treated with 1 equivalent of sodium dithionite (100 mg, 0.564 mmol) in an acetonitrile/water mixture (25/75 v/v) buffered at pH=3.0 for 15 minutes (the reaction being followed by HPLC). The reduced product is extracted with dichloromethane. After reduction of the reaction volume, 500 l of acetic anhydride (8 eq) and 20 mg of dimethylaminopyridine (DMAP) (0.5 eq) are added; the reaction is instantaneous. The dichloromethane phase is then washed with a saturated NaH- CO₃ solution, and is then washed with water. This operation is repeated two to three times. After drying of the dichloromethane phase a purification is carried out on silica gel 60 (70-230 mesh; eluent: dichloromethane), and a precipitation in a dichloromethane/hexane mixture (5/95 v/v); the product is then dried under vacuum. $^1$H NMR (250 MHz; CDCl₃): ppm 2.27 (s, 3H, O—C—CH₃), 2.37 (s, 3H, O—C—CH₃), 7.15 (s, 2H).

EXAMPLE 12

Same experimental conditions as in Example 11.

Use of H₂O₂ as oxygen-donor (7.2 mmol; 1.2 ml of an 8.6M solution). Total conversion of the substrate was obtained in 30 minutes and 320 mg of quinone were obtained among the reaction products, that is a 30% yield.

EXAMPLE 13

Same experimental conditions as in Example 11.

Use of MMPP as oxygen-donor (7.2 mmol; 1.8 g). Total conversion of the substrate in less than 30 minutes and quinone obtained: 363 mg, Yld=34%.

EXAMPLE 14

Same experimental conditions as in Example 11.

Use of t-BuOOH as oxygen-donor (70% solution in water, 7.2 mmol; 670 μl). Conversion of the substrate in approximately 30 minutes and quinone obtained: 107 mg, Yld=10%.

EXAMPLE 15

Substrate 5-chloro-1,3-dimethoxybenzene (6 mmol; 1.03 g).

Same experimental conditions as in Example 11.

Conversion of the substrates in approximately 30 minutes and 2-chloro-6-methoxy-1,4-benzoquinone obtained (290 mg, Yld=28%).

The preceding examples demonstrate the effectiveness of iron porphyrins in the presence of oxidising agent such as potassium monopersulphate KHSO₅ and aqueous hydrogen peroxide H₂O₂ in producing an oxidative dechlorination of 2,4,6-trichlorophenol (Examples 1, 2 and 3). Iron porphyrins which are more hindered in an ortho position on the phenyl nuclei carried in a meso position of the ring are all also active at pH=3.0 (Examples 4, 5 and 6). Supported iron porphyrins are less active than free porphyrins in solution (however, 36% of quinonic product are observed to be formed in 15 min with FeTMPS-Ad).

In Examples 11 to 15 it is possible to observe the effectiveness of the free FeTPPS system in solution in combination with oxygen-donors KHSO₅, H₂O₂, MMPP and t-BuOOH on a chlorinated substrate (100% conversion of the substrate in less than thirty minutes).

EXAMPLES 16 to 22

These examples illustrate the use of the catalytic systems of the process of the invention in various substrates: polycondensed aromatics, chlorinated polycyclic aromatics, chlorinated cyclic aliphatic hydrocarbons, both in homogeneous catalysis and in heterogeneous catalysis.

The general conditions of these catalytic tests were as follows:

EXAMPLE 16

Substrate: benzo(a)pyrene (0.1 mmol; 25.2 mg); acetonitrile (15 ml); 0.1M pH 3 citrate-phosphate buffer (20 ml); FeTPPS (1 μmol; 1.4 mg); oxidising solution (150 mg of KHSO₅ dissolved in 10 ml of 0.1M citrate-phosphate buffer). After five minutes' reaction the product formed (100% conversion) is extracted with dichloromethane. The quinonic product exhibits an absorption band at 265 nm and 2 bands at 420 nm and 450 nm in visible UV. Analysis by DCI/NH₃ mass spectrometry gives an intense peak at 283 (2 carbonyl functional groups present in quinonic forms).

EXAMPLE 17

Substrate (20 μmol, 50 μmol of a 40 mM solution of 2,4,6-trichlorophenol in acetonitrile; FeTMPS-Ad (2 μmol; 100 mg of resin); 1 ml of 0.5M phosphate buffer (pH=6.0); KHSO₅ (100 μmol, 30.7 mg in 500 μl of pH 6.0 buffer). Sampling of 20 μl of reaction mixture: UV visible analysis in acetonitrile (1 ml cell and 1 cm optical path).

EXAMPLE 18

Same experimental conditions as in Example 17. Replacement of FeTMPS-Ad with MnTMPS-Ad(N) (2 μmol; 100 mg of resin). EXAMPLE 19

Same experimental conditions as in Example 17. Replacement of 2,4,6-trichlorophenol with benzo(a)pyrene.

EXAMPLE 20

Same experimental conditions as in Example 19. Replacement of FeTMPS-Ad with MnTMPS-Ad(N) (2 μmol; 100 mg of resin).

EXAMPLE 21

Same experimental conditions as in Example 16. Substrate: lindane (γ-hexachlorocyclohexane) (0.1 mmol; 29 mg). The substrate is 100% converted after 60 min. DCI/NH₃ mass spectrometry analysis gives several fragments at 107, 130, 137, 146, 180). Infrared analysis shows frequencies related to C=O (1715 cm$^{-1}$) or acid (1715 cm$^{-1}$ and C—O at 1100-1024 cm$^{-1}$) functional groups.

EXAMPLE 22

Same experimental conditions as in Example 16. Substrate: DDT (0.1 mmol; 35.4 mg); after 60 min the conversion is 100%. Infrared analysis shows a number of oxidation products containing C=O bands at 1640 cm$^{-1}$ and at 1715 cm$^{-1}$, and C=C=C bands at 1900-1950 cm$^{-1}$.

The results obtained are summarised in Table II.

TABLE II

| Ex. | Substrate | Catalyst | pH | Conversion (%) 15 min | 60 min |
|---|---|---|---|---|---|
| 16 | Benzopyrene | FeTPPS | 3 | 100 | — |
| 17 | Trichlorophenol | FeTMPS-Ad | 6 | 45 | 100 |
| 18 | Trichlorophenol | MnTMPS-Ad | 6 | 45 | 100 |
| 19 | Benzopyrene | FeTMPS-Ad | 6 | 18 | 65 |
| 20 | Benzopyrene | MnTMPS-Ad(N) | 6 | 25 | 69 |
| 21 | Lindane | FeTPPS | 3 | — | 100 |
| 22 | DDT | FeTPPS | 3 | — | 100 |

The oxidation of benzo(a) pyrene by the 1% FeTPPS/catalyst/KHSO₅ system results in a few minutes in the complete conversion of benzo(a)pyrene into a quinonic product (Example 16). Examples 17 to 20 show that the conversion of 2,4,6-trichlorophenol and of benzo(a)pyrene can be carried out at a substantially neutral pH (pH 6) and using heterogeneous catalysis, achieving good performances. This is particularly advantageous in the case of an industrial treatment of such aqueous effluents. Examples 21 and 22 illustrate the application of the process of the invention to the treatment of aqueous effluents containing aromatic or cycloaliphatic chlorinated hydrocarbon compounds.

We claim:

1. Process for catalytic treatment by oxidative degradation of aqueous effluents containing toxic saturated, unsaturated or aromatic mono- or polycyclic hydrocarbon compounds which comprises conducting said degradation in the presence of a catalyst consisting of a water-soluble metalated meso-tetraphenylporphyrin in combination with a water-soluble peroxide.

2. Process according to claim 1, wherein the porphyrin is metalated with iron or manganese.

3. Process according to either claim 1 or claim 2, wherein the phenyl nuclei of the porphyrin contain at least one substituent in position 3, 4 or 5 rendering the porphyrin water-soluble.

4. Process according to claim 3, wherein the phenyl nuclei of the porphyrin contain in positions 2 and 6 substituents selected from the group consisting of halogens and alkyl hydrocarbon radicals containing from 2 to 6 carbon atoms and aryl radicals.

5. Process according to claim 1 wherein the peroxide is selected from the group consisting of inorganic peroxides, organic peroxides and alkyl hydroperoxides.

6. Process according to claim 1 which is carried out at a pH lower than or equal to 6.

7. Process according to claim 1 wherein the reaction medium contains from 5 to 70% by volume of acetonitrile.

8. Process according to claim 1 wherein the effluent being treated contains polycondensed aromatics.

9. Process according to claim 1 wherein the effluent being treated contains chlorinated cyclic hydrocarbons.

10. Process according to claim 1 wherein the effluent being treated contains benzo(a)pyrene.

11. Process according to claim 1 wherein the effluent being treated contains 2,4,6-trichlorophenol and lindane.

* * * * *